US009134139B1

(12) United States Patent
Compani-Tabrizi

(10) Patent No.: US 9,134,139 B1
(45) Date of Patent: Sep. 15, 2015

(54) COMPANI BRIDGE, NUT, AND FINGERBOARD COMBINATION DESIGNS FOR STRINGED MUSICAL INSTRUMENTS

(71) Applicant: Behrooz Compani-Tabrizi, Laguna Hills, CA (US)

(72) Inventor: Behrooz Compani-Tabrizi, Laguna Hills, CA (US)

(73) Assignee: Behrooz Compani-Tabrizi, Laguna Hills, CA (US)

( * ) Notice: Subject to any disclaimer, the term of this patent is extended or adjusted under 35 U.S.C. 154(b) by 0 days.

(21) Appl. No.: 14/334,917

(22) Filed: Jul. 18, 2014

(51) Int. Cl.
*G10D 3/06* (2006.01)
*G01D 3/06* (2006.01)

(52) U.S. Cl.
CPC ........................................ *G01D 3/06* (2013.01)

(58) Field of Classification Search
None
See application file for complete search history.

(56) References Cited

U.S. PATENT DOCUMENTS

| | | | | | |
|---|---|---|---|---|---|
| 554,828 | A | * | 2/1896 | Maldura | 84/307 |
| 973,719 | A | * | 10/1910 | Consoli | 84/314 R |
| 1,140,697 | A | * | 5/1915 | Mecartea | 84/314 R |
| 2,469,582 | A | * | 5/1949 | Strong | 84/293 |
| 2,853,911 | A | * | 9/1958 | Plants | 84/274 |
| 3,143,028 | A | * | 8/1964 | Fender | 84/293 |
| 3,478,631 | A | * | 11/1969 | Fisher | 84/293 |
| 4,290,336 | A | * | 9/1981 | Peavey | 84/291 |
| 4,311,078 | A | * | 1/1982 | Falgares | 84/314 R |
| 4,681,009 | A | * | 7/1987 | Mouradian | 84/293 |
| 4,777,858 | A | * | 10/1988 | Petschulat et al. | 84/314 R |
| 5,085,115 | A | * | 2/1992 | Schlink | 84/310 |
| 5,696,337 | A | * | 12/1997 | Hall | 84/314 R |
| 5,852,249 | A | * | 12/1998 | Steinberg et al. | 84/293 |
| 6,005,173 | A | * | 12/1999 | Mitchell | 84/291 |
| 6,111,175 | A | * | 8/2000 | Lasner | 84/293 |
| 6,114,618 | A | * | 9/2000 | Anke | 84/314 R |
| 6,350,940 | B1 | * | 2/2002 | Upchurch et al. | 84/314 R |
| 6,774,292 | B2 | * | 8/2004 | Mace | 84/293 |
| 8,937,236 | B2 | * | 1/2015 | Kunstadt | 84/314 R |
| 2015/0082966 | A1 | * | 3/2015 | Compani-Tabrizi | 84/314 R |

* cited by examiner

*Primary Examiner* — Robert W Horn

(57) ABSTRACT

In a conventional stringed musical instrument the nut, the bridge and the fingerboard are either all radius or all flat. Bowed instruments such as cellos and violins require radius structures so that single note melodies can be played on the middle strings. But for some players the radius fingerboards are a bit harder while playing melodies. Classical and flamenco guitars have flat nut, bridge and fingerboards for ease of plucking and strumming the strings close to the bridge. However, flat fingerboards are harder to bar for playing cords. [Delete paragraph mark and indent] Combinations of flat nut with radius bridge and radius nut with flat bridge can be used if the fingerboard surface is changed to have a specific 3-dimensional curvature and may be preferred for their playability by some players.

4 Claims, 1 Drawing Sheet

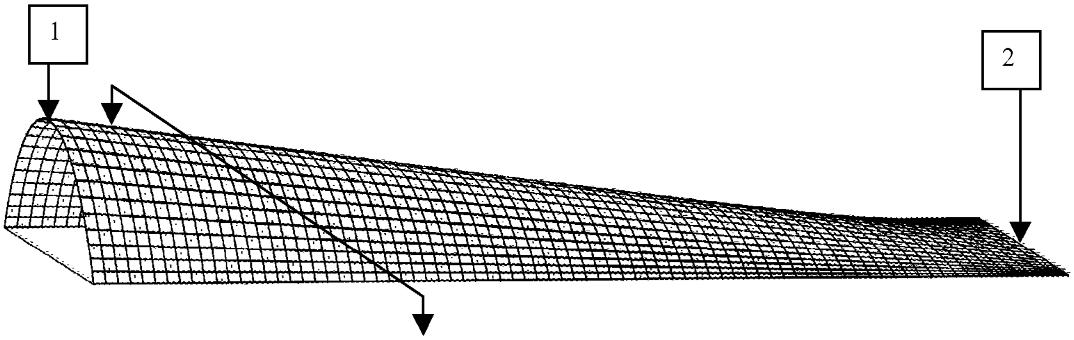

The curvature of this fingerboard along all string directions is flat. The double arrows show the location that the luthier may want to shorten the fingerboard.

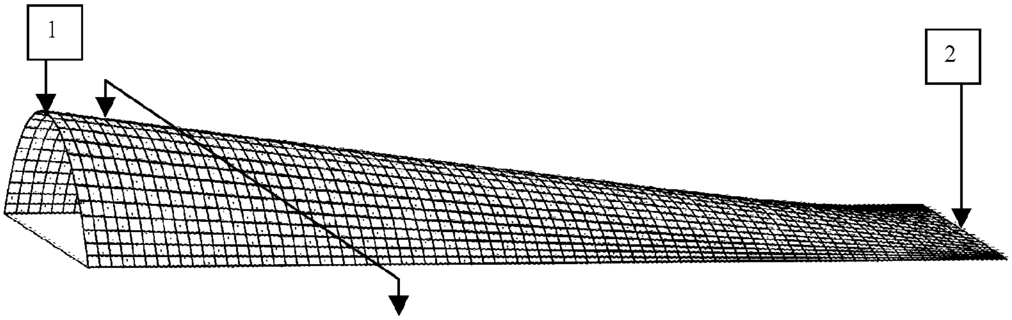

Figure 1. The curvature of this fingerboard along all string directions is flat. The double arrows show the location that the luthier may want to shorten the fingerboard.

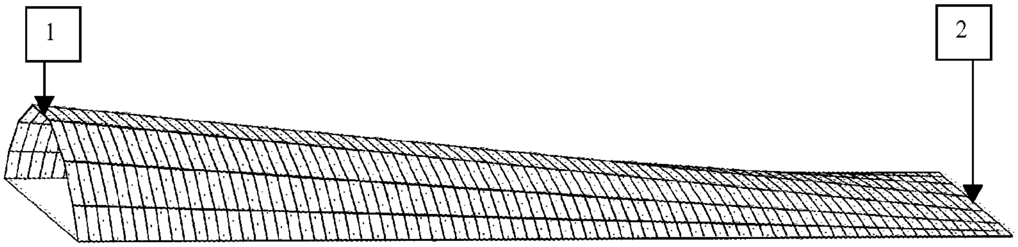

Figure 2. Fingerboard flatness along the fanned-out string directions is better seen on this sparsely sampled plot.

| | |
|---|---|
| 1 | Bridge location: Fingerboard is radius at bridge. |
| 2 | Nut location: Fingerboard is flat at nut. |

COMPANI BRIDGE, NUT, AND FINGERBOARD COMBINATION DESIGNS FOR STRINGED MUSICAL INSTRUMENTS

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention is related to the combined selection and shaping of the bridge, nut, and fingerboards of stringed musical instruments, such as, but not limited to guitars, violins, cellos, basses, mandolins, ouds and lutes.

2. Description of the Related Art

DEFINITIONS

Saddle: The saddle refers to the part of the bridge that physically supports the strings. It may be one piece (typically on acoustic guitars, cellos, violins) or separate pieces, one for each string (electric guitars and basses). If it is made of one piece, it could also serve as the bridge.

Bridge: The bridge is a piece that sits on the top plate (soundboard) and transfers the vibration from the strings to the soundboard. The bridge holds the strings in place on the body. The bridge may also act as saddle if the strings are directly placed on it. Fingerboard: The fingerboard is the neck or usually a strip made of material (e.g., wood) glued on the neck of a stringed musical instrument against which the strings are pressed to produce different musical notes. Fingerboards are also called fretboards in fretted instruments.

Nut: The nut is a piece of hard material that supports the strings at the end closest to the headstock. The nut marks one end of the vibrating length of each open string, sets the spacing of the strings across the neck, and usually holds the strings at the proper height from the fingerboard.

Flat: Flat nuts and bridges are those that have a straight edge (very large or infinite radius of curvature) in the their direction perpendicular to the strings.

Radius: Radius nuts and bridges are those that have a curved edge (finite radius of curvature) in the their direction perpendicular to the strings.

Along with the bridge, the nut defines the vibrating lengths (scale lengths) of the open strings. The present stringed musical instruments have one of the following two construction configurations.

a) All three pieces of nut, bridge, and fingerboard are radius (curved). These instruments include cellos, violins, bases and some guitars.
b) All three pieces of nut, bridge, and fingerboard are flat. These instruments include classical and flamenco guitars.

BRIEF SUMMARY OF THE PRESENT INVENTION

Some combinations of the curvature of the nut, the bridge, and the fingerboards that will improve playability, or may be preferred by some players, are the accomplishments of this invention. Two configurations are designed as follows.

1. A flat nut, a radius bridge together with a fingerboard that is flat at the nut and gradually becomes more radius at its end closer to the bridge. The fingerboard curvature along all string directions is made to be flat. This configuration mostly suits bowed instruments.
2. A radius nut, a flat bridge together with a fingerboard that is radius at the nut and gradually becomes more flat at its end closer to the bridge. The fingerboard curvature along all string directions is made to be flat. This configuration mostly suits plucked and strummed instruments.

BRIEF DESCRIPTION OF THE DRAWINGS

FIG. 1. A fingerboard with a flat nut and a radius bridge. The bridge curvature is exaggerated to illustrate the transition vividly. The curvature of this fingerboard along all string directions is flat. This figure could also be interpreted as a fingerboard with a flat bridge and a radius nut. Normally, the physical fingerboard starts at the nut but does not extend all the way to the bridge. The fingerboard in this figure was modeled and extended in length to the bridge so that the fingerboard curvature can be matched to that of the bridge at the bridge location.

FIG. 2. The flatness of fingerboard along all string directions is better seen on this sparsely sampled plot where the sampling was done along the string directions.

DETAILED DESCRIPTION OF THE INVENTION

The nut, the bridge and the fingerboards are shaped differently in instruments to facilitate plucking, strumming, and bowing the strings of musical instruments as well as fingering and barring the notes.

The bridge is radius in cellos, violins, and other instruments so that the middle strings can be played solo by the bow. With a radius bridge the nut and fingerboard are also radius to get the proper string to fingerboard distances so as to avoid buzzing and achieve ease of playability. Radius bridges do not go well with flat fingerboards and nuts. The combination results in unnecessarily large string to fingerboard distances along the string length if buzzing is to be avoided.

The reason that the bridge is straight in classical and flamenco guitars is that these instruments are plucked and strummed at locations close to the bridge. Curved bridges will put curvature across the strings, as in cellos, and will cause difficulties in plucking and strumming. With a flat bridge the fingerboard and the nut are also made flat to accommodate the proper string to fingerboard distances so buzzing is avoided. Playing instruments such as classical and flamenco guitars also require barring the fretboard to make cords. However, a flat fingerboard is inferior to a curved one while playing cords because flattening of the index finger to mimic the flat fingerboard puts undue tension in the hand and fingers. For these instruments the radius fingerboard would feel more natural to the curve of the fingers, so it would be a little easier to bar and play.

These difficulties can be overcome by constructing a fingerboard with a particular three-dimensional curvature and using it with the proper combination of curvatures of the nut and the bridge. Two combinations of curvatures that improve playability are as follows.

1. A flat nut, a radius bridge (radius of curvature R), and a fingerboard that transitions from flat at the nut location to radius (the same radius of curvature R) if it were to be extended to the bridge. The physical fingerboard is normally not extended all the way to the bridge and is shortened on the bridge side. The three-dimensional curvature of this fingerboard must be such that the fingerboard surface is made linear (flat) from nut to bridge along the direction of each string.

2. A radius nut (radius of curvature A), a flat bridge and a fingerboard that transitions from radius (the same radius of curvature A) at the nut location to flat if it were to be extended to the bridge. The physical fingerboard is normally not extended all the way to the bridge and is shortened on the bridge side. The three-dimensional curvature of this fingerboard must be such that the fingerboard surface is made linear from nut to bridge along the direction of each string.

In most instruments the strings fan out from nut to bridge. Keeping in mind the importance of the flatness of the fingerboard along every string direction, the fingerboard surfaces can be mathematically modeled. The three-dimensional curvature of the fingerboard is determined by the curvatures of the nut and the bridge (flat or radius) and its required flatness along every string direction. The procedure to construct the fingerboard surface is to write the equations for the curvatures of the nut and saddle (bridge top) and use three-dimensional parametric equations of straight lines to connect the nut points to their corresponding saddle points to generate the surface. This was done in modeling FIGS. 1 and 2 using guitar dimensions. The modeling results can be fed into CNC machines to manufacture the physical fingerboards. Alternatively, practical procedures can be used by the luthier to hand carve the fingerboard surfaces that have the desired flat or radius bridge and nut curvatures and are straight along the string directions.

The invention claimed is:

1. A fingerboard for stringed musical instruments where the fingerboard surface is flat at the nut and gradually becomes radius at its end closer to the bridge such that the fingerboard curvature along all string directions is flat.

2. Combination of a flat nut, a radius bridge and the fingerboard of claim 1 for stringed musical instruments.

3. A fingerboard for stringed musical instruments where the fingerboard surface is radius at the nut and gradually becomes less radius (i.e., more flat) at its end closer to the bridge such that the fingerboard curvature along all string directions is flat.

4. Combination of a radius nut, a flat bridge and the fingerboard of claim 3 for stringed musical instruments.

* * * * *